United States Patent Office 3,101,358
Patented Aug. 20, 1963

3,101,358
17β-ACETAMINO-STEROIDS
Pietro De Ruggieri, Carlo Ferrari, and Carmelo Gandolfi, Milan, Italy, assignors to Ormonoterapia Richter S.p.A., Milan Italy, a corporation of Italy
No Drawing. Filed Jan. 17, 1962, Ser. No. 166,953
Claims priority, application Italy Oct. 11, 1960
11 Claims. (Cl. 260—397.5)

This invention relates to the preparation of new and improved steroids effective on the central nervous system as ganglioplegics and medulla depressants and therefore useful as hypotensive agents.

The compounds of the invention may be illustrated by the general formula

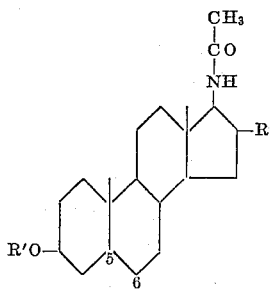

wherein the linkage between the 5 and 6 carbon atoms may be a single or double bond, R is an α-methyl group or a β-methyl group and R' is a hydrogen atom or an acyl group derived from a lower alkanoic acid, particularly an acetyl group.

As starting materials for preparing the present compounds, there may be employed steroid compounds having the general formula

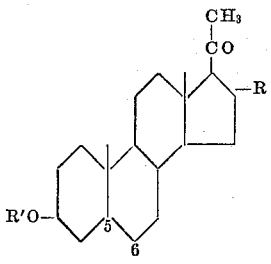

wherein either a single or a double bond exists between carbon atoms 5 and 6 and R and R' have the same meaning as above. These compounds, for example, 16α-methyl - pregn-5-en-3β-ol-20-one, 16β-methyl-pregn-5-en-3β - ol - 20-one, 16α-methyl-5α-pregnan-3β-ol-20-one and their 3-acetates, when treated in benzene or chloroform solution with anhydrous hydrazoic acid (HN₃) result in the corresponding 17-acetamino derivatives.

The reaction may be carried out by forming hydrazoic acid in situ in the reaction mixture by including therein sodium azide and an excess of an acid, such as concentrated sulfuric acid, gaseous hydrochloric acid, acetic acid, p-toluenesulfonic acid or sulfosalicylic acid.

Also, if desired, a solution of anhydrous hydrazoic acid, itself in benzene or chloroform may be used in the presence of a quantity of one of the above-listed acids equivalent to the excess which remains when the source of hydrazoic acid is sodium azide reacted with one of these acids.

The temperature maintained during the reaction may range between 0° C. and the boiling point of the reaction medium, but best results have been obtained when the temperature is maintained between 0° and 10° C.

The following examples are set forth as illustrating, but not as limiting, the invention:

EXAMPLE 1

*16α-Methyl-17β-Acetamino-Androst-5-En-3β-Ol-3-Acetate*

1.105 parts of sodium azide are suspended by shaking in 4 parts of a solution of 16α-methyl-pregn-5- en-3β-ol-20-one-3-acetate in benzene at a temperature of about 10° C. Anhydrous gaseous hydrochloric acid is bubbled through the reaction mixture to saturation and then for an additional 30 minutes.

The suspension is kept at 10° C. for a further 40 minutes, then diluted with ice and made alkaline. The organic layer is separated and washed with water until neutral. The resulting solution is dried with calcium chloride and evaporated to dryness. The crude material obtained is crystallized from methanol and there results 3.2 parts of the product, melting point 192–195° C., $[\alpha]_D = -53°$, infrared maxima at 5.77μ, 6.11μ, 6.52μ, 8μ.

EXAMPLE 2

*16α-Methyl-71β-Acetamino-Androst-5-En-3-Ol*

In accordance with a conventional saponification technique, 1 part of the 16α-methyl-17β-acetamino-androst-5-en-3β-ol-3-acetate of Example 1 is refluxed with 30 parts of 5% methanolic potassium hydroxide for 1 hour over a water bath. The resulting solution is concentrated, diluted with water, and the precipitate which results is separated by filtration. The crude material is crystallized from acetone and there results 0.86 part of the product, melting point 278°–282° C., $[\alpha]_D = -50°$, infrared maxima at 6.11μ, 6.52μ.

EXAMPLE 3

*16β-Methyl-17β-Acetamino-Androst-5-En-3β-Ol-3-Acetate*

3 parts of 16β-methyl-pregn-5-en-3β-ol-20-one-3-acetate dissolved in 30 parts of a molar solution of hydrazoic acid in benzene are refluxed for 15 minutes in the presence of 1.5 parts of p-toluenesulfonic acid. The resulting solution is allowed to stand at room temperature for 3 hours, diluted with ice and made alkaline. The organic layer is washed with water until neutral, dried with calcium chloride and evaporated to dryness. The resulting crude material is crystallized from methanol, resulting in 2.75 parts of the product, melting point 221°–224° C., $$[\alpha]_D = -122°$$

infrared maxima at 5.77μ, 6.10μ, 6.51μ, 8.01μ.

EXAMPLE 4

*16β-Methyl-17β-Acetamino-Androst-5-En-3β-Ol*

The compound of Example 4 is saponified as described in Example 2 to yield the product, melting point 218°–221° C., $[\alpha]_D = -126°$, infrared maxima at 6.10μ and 6.51μ.

EXAMPLE 5

*16α-Methyl-17β-Acetamino-5α-Androstan-3β-Ol-3-Acetate*

To a mixture of 4 parts of 16α-methyl-5α-pregnan-3β-ol-20-one-3-acetate, 30 parts of chloroform and 5 parts of glacial acetic acid, there is incrementally added with shaking over a period of 20 minutes, 1.150 parts of sodium azide with the temperature being maintained at approximately 5° C. The mixture is brought to 40° C. and allowed to stand at this temperature for one hour, then diluted with ice and made alkaline. The organic layer is separated, washer with water until neutral, dried with calcium chloride and then evaporated to dryness. The resulting crude material is crystallized from methanol resulting in the product, melting point 203°–205°C., $[\alpha]_D = -41°$, infrared maxima 5.75μ, 6.11μ, 6.52μ, 8μ.

EXAMPLE 6

*16α-Methyl-17β-Acetamino-Androstan-3β-Ol*

The compound of Example 5 is saponified in accordance with the procedure outlined in Example 2 to provide the product, melting point 268°–271° C., $[\alpha]_D = -48°$, infrared maxima at 6.11μ, 6.54μ.

The present invention is a continuation-in-part of our copending application Serial No. 75,092, now abandoned, filed December 12, 1960.

We claim:

1. A compound of the formula

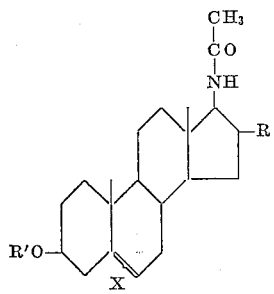

wherein X is selected from the group consisting of single and double bonds, R is a member selected from the group consisting of an α-methyl and a β-methyl group and $R^1$ is a member selected from the group consisting of hydrogen and an acyl radical derived from a lower alkanoic acid.

2. 16α - methyl - 17β-acetamino-androst-5-en-3β-ol-3-acetate.

3. 16α-methyl-17β-acetamino-androst-5-en-3β-ol.

4. 16β - methyl - 17β-acetamino-androst-5-en-3β-ol-3-acetate.

5. 16β-methyl-17β-acetamino-androst-5-en-3β-ol.

6. 16α - methyl - 17β-acetamino-5α-androstan-3β-ol-3-acetate.

7. 16α-methyl-17β-acetamino-5α-androstan-3β-ol.

8. A process for the preparation of a compound having the general formula

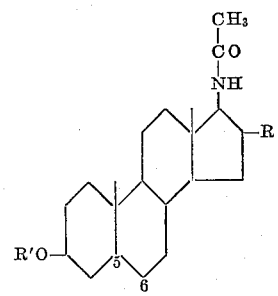

wherein the bond between the 5- and 6-carbon atoms is selected from the group consisting of a single bond and a double bond, R is selected from the group consisting of hydrogen, an α-methyl group and a β-methyl group and R' is selected from the group consisting of hydrogen and an acetyl radical, comprising reacting with anhydrous hydrazoic acid a compound having the general formula

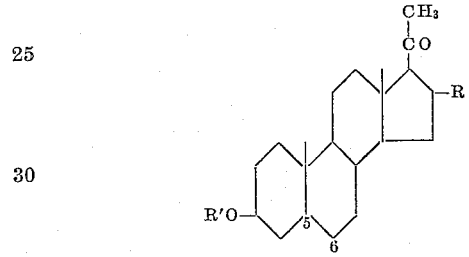

wherein the bond between the 5- and 6-carbon atoms is selected from the group consisting of a single bond and a double bond, and R and R' have the same meaning as above.

9. A process as claimed in claim 8, wherein the reaction is carried out in the presence of an anhydrous acid in an organic solvent selected from the group consisting of chloroform and benzene.

10. A process as claimed in claim 9 wherein said acid is selected from the group consisting of concentrated sulfuric acid, gaseous hydrochloric acid, acetic acid, p-toluenesulfonic acid and sulfosalicylic acid.

11. A process as claimed in claim 8 wherein said hydrazoic acid is formed in situ by reaction of Na azide with an acid selected from the group consisting of sulfuric acid, gaseous hydrochloric acid, acetic acid, p-toluenesulfonic acid and sulfosalicylic acid.

References Cited in the file of this patent

UNITED STATES PATENTS 2,655,520    Schmidt-Thomé _____ Oct. 13, 1953